United States Patent [19]

Stewart et al.

[11] 3,937,238

[45] Feb. 10, 1976

[54] VARIABLE AREA ENGINE INLET

[75] Inventors: Donald J. Stewart, Enfield; Richard A. Streib, Rockville, both of Conn.

[73] Assignee: United Technologies Corporation, Hartford, Conn.

[22] Filed: Feb. 25, 1975

[21] Appl. No.: 552,911

[52] U.S. Cl............ 137/15.1; 415/119; 181/33 HA
[51] Int. Cl.²......................................... F02C 7/04
[58] Field of Search...... 137/15.1, 15.2; 181/33 HA; 138/45; 415/119; 60/269

[56] References Cited
UNITED STATES PATENTS

| | | | |
|---|---|---|---|
| 3,043,102 | 7/1962 | Orlin | 137/15.1 |
| 3,572,961 | 3/1971 | Medawar | 415/119 |

Primary Examiner—Alan Cohan
Attorney, Agent, or Firm—Charles A. Warren

[57] ABSTRACT

An inlet for a gas turbine power plant with a translating annular ring which cooperates with the nose cone to reduce the effective inlet area, serving to reduce compressor noise.

9 Claims, 4 Drawing Figures

VARIABLE AREA ENGINE INLET

BACKGROUND OF THE INVENTION

Currently known variable area inlet schemes utilize either an external or an internal translatable body for reducing the inlet throat area to the required amount. The problem is complicated by reduced airflow requirements at aircraft approach conditions where the engine flow is low and requires as much as a forty percent throat area change. The known internal or external translatable bodies require an inlet that may be three times as long as the conventional inlet in order to provide the required change area without loss in high inlet performance.

SUMMARY OF THE INVENTION

The present invention avoids the above objections with a translatable annular ring located between the outer wall of the inlet and forwardly of the nose cone, in effect forming two inlet passages. The passage between the outer wall and the annular ring is open at all times to the compressor. The space within the annular ring is closed when the engine is choked by contact between the ring and the engine nose cone or close proximity of the end of the ring to the cone. By translating the ring forward away from the nose cone, air flowing through the ring also enters the compressor. Adjustment of this ring establishes the degree of choked condition desired.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
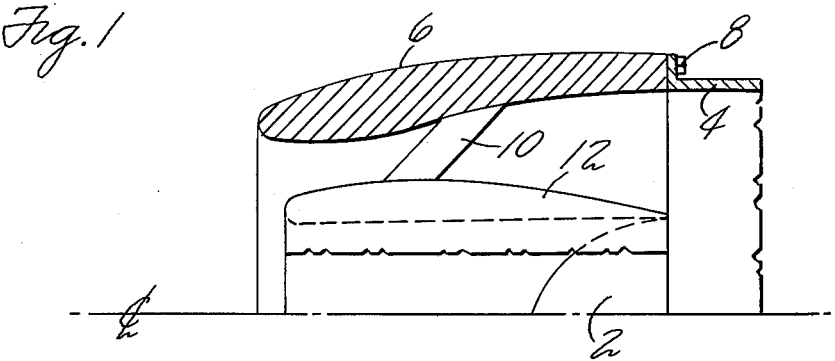
FIG. 1 is a longitudinal sectional view through the inlet in choked condition.
Figure 2:
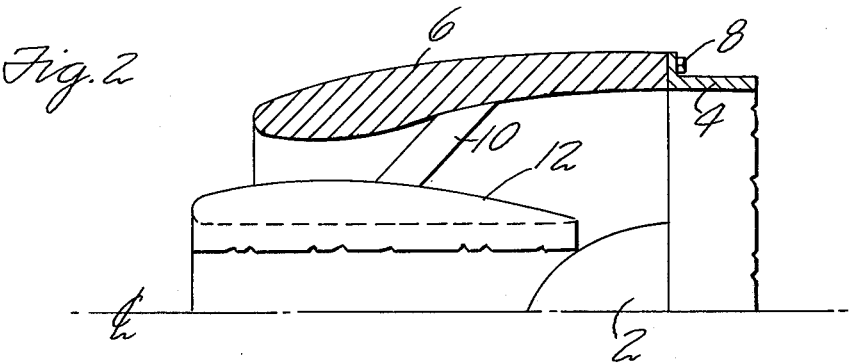
FIG. 2 is a view similar to FIG. 1 with the translatable ring in cruise position.

Referring first to FIG. 1, the inlet is designed for use with a gas turbine engine having a compressor, not shown, into which the air is directed by the inlet arrangement shown. For the purpose of this invention the annular inlet to the compressor is defined between the nose cone 2, and the other case 4 of the compressor.

The engine inlet comprises an outer annular body 6 preferably airfoil in cross section as shown and secured at its trailing edge to the leading edge of the outer compressor case 4 as by bolts 8. The inner surface of this body 6 forms the outer wall of the air inlet and preferably is shaped to form a divergent subsonic inlet as shown.

Projecting radially inwardly from the body 6 are a plurality of struts 10 to support an annular ring 12, the latter also being streamlined from leading to trailing end as shown. The radial dimension of the trailing end of the ring is as small as or smaller than the outer dimension of the nose cone such that the trailing end will engage with or be in close proximity to the nose cone as shown in FIG. 1, when in the rearward position thereby effectively cutting off any flow of air through the ring and into the compressor. This is the choked position and, at this time, as will be apparent, the only effective area of the inlet is that between the ring and the outer body. The area is thus diminished to the degree necessary for effective operation of the engine at fully choked conditions, as for example, in aircraft approach conditions where minimum engine noise is desired. The area of the ring 12 is selected to reduce the airflow the desired amount.

At cruise condition the ring 12 is translated forward to separate the trailing edge of the ring from the nose cone and thus admit air from within the ring into the compressor inlet. Obviously this translation of the ring may be to any extent desired until the space between the trailing edge of the ring and the nose cone permits a maximum flow through the ring.

The particular mechanism for translating the annular ring is dependent on space requirements. For example, the ring 12 may have a partial or complete cylindrical surface 14 therein to serve as a guide, and this guide fits within a sleeve 16 supported by the struts 10. Thus the ring 12 is guided to move within the sleeve. A fluid motor including a cylinder 18 and piston rod 20 may actuate the ring as by securing the cylinder to the ring 12 and the piston rod to the sleeve 16. Fluid to actuate the motor may be supplied through ducts in one of the struts.

Figure 3:
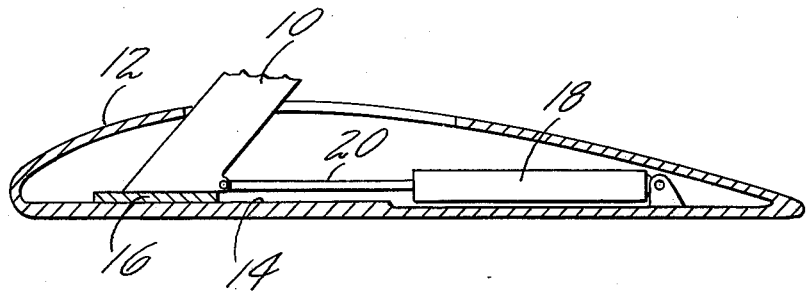
FIG. 3 is a detail of the connection between the struts and the ring.
Figure 4:
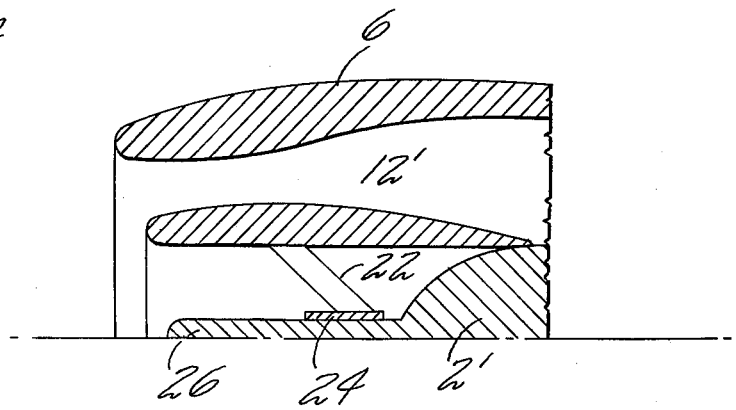
FIG. 4 is a view similar to FIG. 1 of a modification.

In the arrangement of FIG. 4 the annular ring 12' is positioned within and spaced from the outer body 6' and is supported on struts 22 extending outwardly from a sleeve 24 on a projecting stub 26 on the nose cone 2'. In this case the struts are secured to the ring 12' at their outer ends and connected at their inner ends to the sleeve 24 slidable on the stub 26. This sleeve 24 may be actuated in much the same manner as described above in connection with FIG. 3.

In either arrangement the structure is such that the choking effect of the ring is accomplished by the function of the trailing edge of the ring in cooperation with the nose cone in reducing or cutting off the flow of air through the ring to the compressor inlet. The function of a choked flow in reducing engine noise, particularly compressor noise, is understood and need not be described. Although the trailing edge of the ring is shown as in contact with the nose cone in practice it may be that a small gap will exist, with the trailing edge in close proximity to or substantially in contact with the nose cone surface.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. An inlet for a gas turbine power plant including an outer ring forming the outer wall of the inlet,
an inner nose cone defining the inner wall of the inlet,
an annular ring positioned between the outer ring and the nose cone and having a trailing edge positioned substantially in engagement with the nose cone, and means for moving said annular ring axially to position it such that the trailing edge is movable out from the nose cone.

2. An inlet as in claim 1 including struts carried by one of said walls for supporting the annular ring.

3. An inlet as in claim 1 in which the annular ring is airfoil shape in cross section.

4. An inlet as in claim 1 including a forward extension on the nose cone forming a guide and a sleeve on said extension, the struts extending inwardly from the annular ring to the sleeve.

5. An inlet for admission of air to the compressor of a gas turbine engine, said inlet including:
   a nose cone forming the inner wall of the air path to the compressor,
   a surrounding member forming the outer wall of the air path to the compressor,
   an annular ring positioned between said nose cone and said member to establish flow areas on opposite sides of said ring, said ring having a trailing edge no larger in diameter than the largest diameter of the nose cone,
   struts extending from one of said walls to said ring for holding said ring in predetermined relation to the walls, and
   means for translating said ring axially to position the trailing edge in contact with the nose cone or in axially spaced relation thereto.

6. An inlet as in claim 5 including struts extending between said ring and one of said walls for supporting said ring in concentric relation to said walls.

7. An inlet as in claim 6 in which the struts extend inward from the surrounding member to the annular ring and are axially movable on one of said member or ring.

8. An inlet as in claim 6 in which the struts extend inwardly from said annular ring to the nose cone.

9. An inlet as in claim 6 in which the nose cone has a projecting stub with a sleeve axially movable thereon and the struts extend inwardly from the annular ring to said sleeve.

* * * * *